United States Patent [19]

Edelmayer

[11] Patent Number: 5,022,823
[45] Date of Patent: Jun. 11, 1991

[54] ROTOR ATTACHMENT ASSEMBLY

[75] Inventor: Thomas C. Edelmayer, Mobile, Ala.

[73] Assignee: Teledyne Industries, Inc., Los Angeles, Calif.

[21] Appl. No.: 319,087

[22] Filed: Mar. 6, 1989

[51] Int. Cl.$^5$ .............................................. F04D 29/20
[52] U.S. Cl. ....................... 416/244 A; 416/204 A; 403/259; 411/339; 411/366
[58] Field of Search ........... 416/244 R, 244 A, 244 B, 416/196 R, 204 R, 204 A, 223 B; 403/259, 345; 411/366, 339, 429, 547, 324

[56] References Cited

U.S. PATENT DOCUMENTS

| 910,678 | 1/1909 | Hardin | 411/324 |
|---|---|---|---|
| 2,577,134 | 12/1951 | Land | 416/171 |
| 2,799,445 | 7/1957 | Hull | 416/188 |
| 3,314,701 | 4/1967 | Durham | 403/20 |
| 3,414,304 | 12/1988 | Miller | 411/339 |
| 3,611,881 | 10/1971 | Little | 411/324 |
| 3,849,982 | 11/1974 | Hall | 416/244 B |
| 3,904,301 | 9/1975 | Schroeder | 403/299 |
| 4,125,344 | 11/1973 | Tiefenbacher | 416/183 |
| 4,183,719 | 1/1980 | Bozung | 416/183 |

FOREIGN PATENT DOCUMENTS 1203812 1/1960 France .................... 416/244 A

Primary Examiner—Robert E. Garrett
Assistant Examiner—John T. Kwon
Attorney, Agent, or Firm—Gifford, Groh, Sprinkle, Patmore and Anderson

[57] ABSTRACT

A rotor attachment assembly for securing a rotor, such as a compressor impeller, to a rotor shaft. The assembly comprises a locking nut, a rotor having a flush mounting surface for the flush mounting of the locking nut, and a nut-receiving rotor shaft. The shaft comprises a smooth body and a threaded end which is of less diameter than the shaft body. The nut includes an unthreaded bore portion and a threaded portion. When the rotor is in place on the shaft, part of the smooth body extends beyond the nut flush mounting surface of the rotor. The bore portion of the nut is deeper than the length of the part of the smooth body extending beyond the rotor. Accordingly, when the nut is tightened onto the shaft to press against the rotor, a gap is left between the body of the shaft and the threaded portion of the nut. Coaxiality of the shaft and the rotor is assured by this construction which provides against bending of the shaft.

21 Claims, 1 Drawing Sheet

ROTOR ATTACHMENT ASSEMBLY

BACKGROUND OF THE INVENTION

I. Field of the Invention

The present invention relates to rotor attachment assemblies, and more particularly relates to such a structure which provides for coaxiality of a rotor and a rotor shaft and which thereby provides against bending of the shaft.

II. Description of the Prior Art

A variety of conventional mechanisms include rotors or the rotating part of a mechanical device. Conventional turbine engines and turbomechanisms such as turbochargers as the primary examples include impellers as rotors which are driven by fluids. According to the prior art, customary practice has been to mount the impeller, which is that member of the rotor class of which we are primarily concerned, on a drive shaft. To rigidly fix the impeller (or rotor) to the drive shaft, a substantially standard nut has conventionally been used. Known drive shafts include a smooth body which terminates at a shoulder leading to the nut-receiving threads defined in the end portion of the shaft.

As is conventionally known, the length of the smooth body is equivalent to the length of the shaft-receiving aperture in the impeller. Accordingly, when the impeller is fully pressed upon the shaft, only the threaded portion of the shaft extends beyond the rotor. The rotor is then secured to the shaft by a conventional nut, possibly in combination with one or more flat or lock washers, which press against the rotor. The nut base (or a washer) and the surface of the rotor mate with one another in this construction.

Known methods of fastening a rotor to a rotor shaft suffer from a variety of disadvantages. First, using conventional retention methods, the shaft may bend in response to non-uniform loading due to improperly manufactured tolerances. These errors, even though relatively slight, nevertheless cause non-parallelism of the assembled rotor and the nut mating surfaces.

A bent rotor shaft results in at least two problems which affect performance. First, the rotor's center of gravity is shifted resulting in rotational imbalance. Second, the rotor embodies increased radial runout, thus reducing or possibly eliminating fin clearance.

In response to these undesirable characteristics, attempts have been made to minimize shaft bending by incorporating spherically-faced nuts and washers or by making manufacturing tolerances more stringent. However, spherically-faced nuts and washers require trial-and-error adjustment. Readjustment is often subsequently required. More stringent manufacturing tolerances result in manufacturing cost increases.

Accordingly, prior inventions have failed to eliminate the problems commonly associated with known rotor assembly designs.

SUMMARY OF THE PRESENT INVENTION

The present invention is a rotor attachment assembly for securing a rotor, such as a compressor impeller, to a rotor shaft. The assembly comprises a locking nut, a rotor, and a nut receiving rotor shaft. The shaft comprises a smooth body and a threaded end which is of less diameter than the shaft body. The nut includes an unthreaded bore portion and a threaded portion wherein the unthreaded bore is of greater diameter than the threaded portion, thus comprising a counterbore construction. The smooth body of the shaft and the unthreaded bore of the nut have a very close tolerance, so close as to preferably comprise an interference fit. The threaded end of the shaft and the threaded portion of the nut have a class two fit.

When the rotor of the present invention is in place on the shaft, part of the smooth body extends beyond the nut flush mounting surface of the rotor. The bore portion of the nut is deeper than the length of the part of the smooth body extending beyond the rotor. Accordingly, when the nut is tightened onto the shaft to press against the rotor, a gap is left between the body of the shaft and the threaded portion of the nut.

This construction offers a number of significant advantages over the known art. First, the screw-to-nut thread clearance is increasable to a class two (free fitting) thread. Second, by piloting the nut onto the shaft by means of the interference fit counterbore rather than by the threads alone, coaxiality of the shaft and nut are assured. Accordingly, the parallelism of the assembled rotor and the nut mating surfaces is dependent upon the perpendicularity of those surfaces to their bores. With proper manufacturing control of perpendicularity of those surfaces, shaft bending and its associated problems are eliminated in a low cost manner.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENT OF THE PRESENT INVENTION

Figure 1:
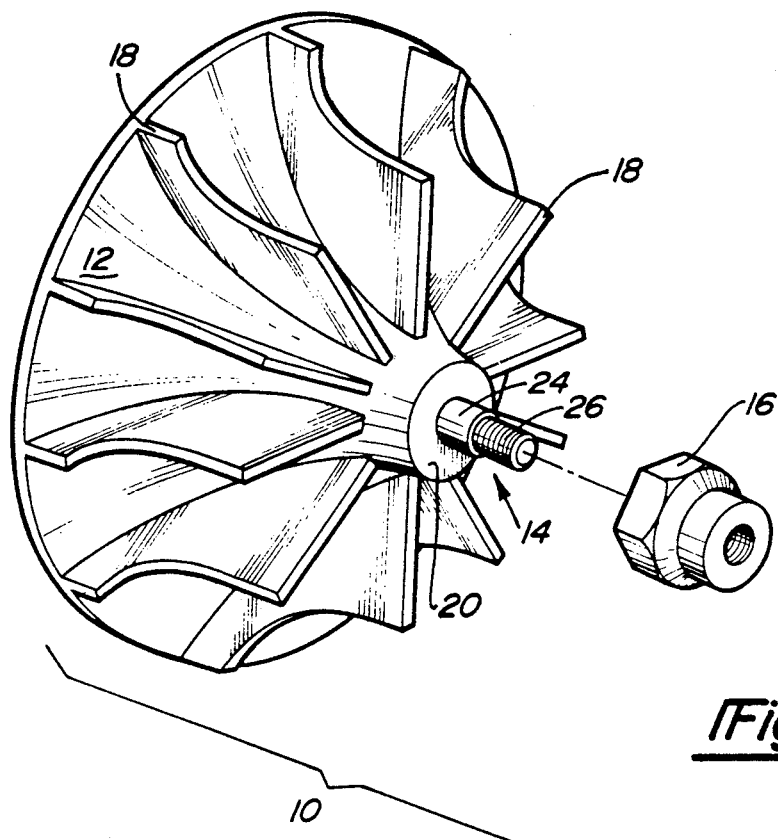
FIG. 1 is a perspective, partially exploded view illustrating the rotor attachment assembly according to the present invention.
Figure 2:
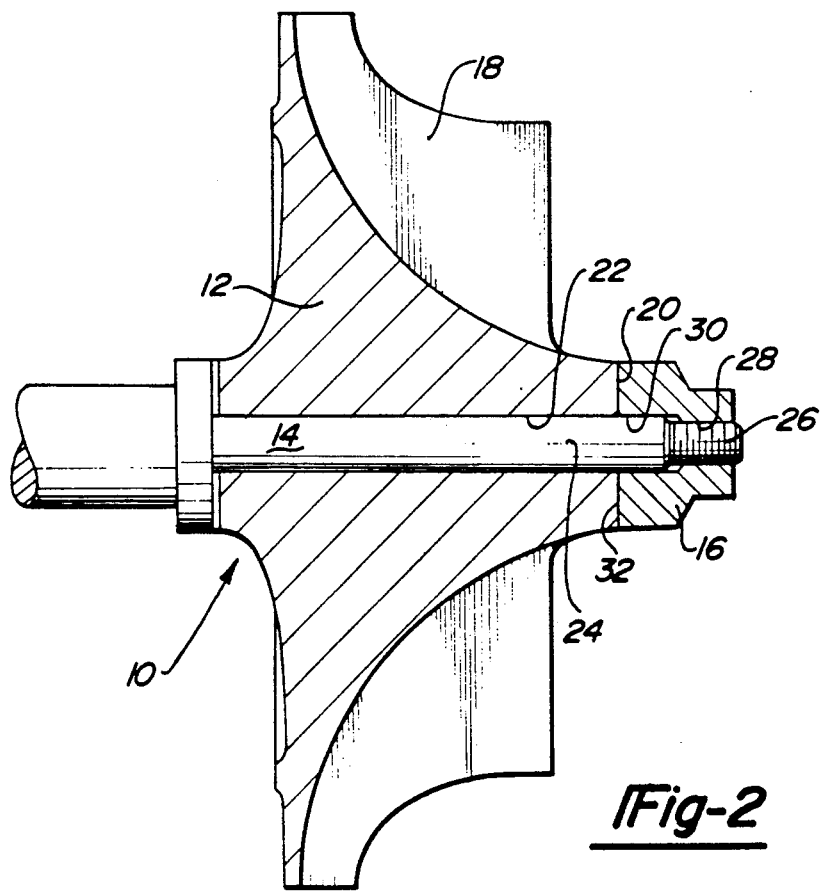
FIG. 2 is a cross-sectional view of an assembled rotor attachment assembly according to the present invention.

FIGS. 1 and 2 show a preferred embodiment of the present invention. While the configuration according to the illustrated embodiment is preferred, it is envisioned that alternate configurations of the present invention may be adopted without deviating from the invention as portrayed. The preferred embodiment is discussed hereafter.

With reference to FIG. 1, there is shown an exploded view of a rotor attachment assembly generally indicated as 10. The assembly 10 comprises a rotor 12, a shaft 14, and a nut 16. As illustrated, the rotor 12 is in place on the shaft 14 while the nut 16 has yet to be fastened to the shaft 14.

The rotor 12 is illustrated as being a compressor impeller, although the present invention may be applicable to the rotating parts of many mechanical devices having similar configurations. The rotor 12 comprises a plurality of fins 18.

The rotor 12 also includes a nut mating surface 20 which is perpendicular to a rotor shaft receiving bore 22 (see FIG. 2) of the rotor 12.

The rotor shaft 14 includes a smooth body 24 (a portion of which is visible in this figure) and a threaded nut receiving portion 26. The nut receiving portion 26 is of less diameter than the smooth body portion 24, as illustrated.

With reference now to FIG. 2, a cross-sectional view of the rotor attachment assembly 10 is illustrated. According to this view, all of the elements of the assembly are in place in their assembled and tightened positions.

Also this view, the full length of the smooth body 24 of the shaft 14 is visible. A portion of the body 24 can be seen extending beyond the nut mating surface 20 of the rotor 12. The rotor 12 preferably has a rotating fit with respect to the smooth body 24 of the shaft 14.

The nut 16 has defined therein a threaded hole 28 which is substantially matable with the threaded nut receiving portion 26 of the shaft 14. As discussed above, the screw-to-nut thread clearance need only be a class two (free fitting) thread.

The nut 16 also has defined therein a shaft locating hole or counterbore 30 which is substantially matable with the portion of the smooth body 24 which extends beyond the nut mating surface 20 of the rotor 12.

The counterbore 30 and the body 24 should be machined to a close tolerance, preferably resulting in an interference fit. At the base of the nut 16 there is a rotor mating surface 32 which is perpendicular to the counterbore 30 and the threaded hole 28.

When the nut 16 is fully threaded onto the shaft 14, the nut mating surface 20 of the rotor 12 and the rotor mating surface 32 of the nut 16 mate with each other with a close parallel fit, as illustrated. With the nut 16 thus in its locking position as illustrated in FIG. 2, it can be seen that the counterbore 30 is deeper than the length of that portion of the body 24 extending beyond the nut mating surface 20 of the rotor 12. Thus even with the nut 16 fully in place, a gap remains between the body 24 and the base of the threaded hole 28 of the nut 16. According to this construction, as noted above, by piloting the nut 16 onto the shaft 14 by means of the interference fit counterbore rather than by threads alone, coaxiality of the shaft 14 and the nut 16 are assured.

I claim:

1. A rotor attachment assembly for accurately positioning a rotor on a rotor shaft, comprising:
   a rotor;
   said rotor having a rotor shaft receiving aperture axially defined therein;
   a rotor shaft having a substantially smooth elongated shaft body for attachment to said rotor;
   said rotor shaft further having a threaded end portion;
   a nut for holding said rotor to said shaft, said nut having an aperture axially defined therein, said aperture including a shaft locating hole having a smooth inner wall and a threaded portion for receiving said shaft; and
   said elongated shaft body being of sufficient length so that a portion of said shaft body extends beyond said rotor when said rotor is in place on said rotor shaft;
   said rotor having a multi-vaned body portion and a nut mating portion, said nut mating portion extending beyond said multi-vaned body portion;
   said nut mating portion having a substantially planar nut mating surface;
   said nut mating surface being perpendicular to said axially-defined aperture of said rotor;
   said nut having a substantially planar rotor mating surface for mating with said nut mating surface;
   said rotor mating surface being perpendicular to said axially-defined aperture of said nut;
   said smooth shaft body and said smooth inner wall of said nut having an interference fit.

2. A rotor attachment according to claim 1, wherein said shaft locating hole is an unthreaded counterbore.

3. A rotor attachment according to claim 1, wherein said elongated shaft body is smooth.

4. A rotor attachment according to claim 2, wherein said threaded end portion is externally threaded.

5. A rotor attachment according to claim 4, wherein said threaded end portion is of less diameter than said elongated shaft body.

6. A rotor attachment according to claim 5, wherein said unthreaded counterbore is slightly longer than said portion of said shaft extending beyond said rotor.

7. A rotor attachment according to claim 2, wherein said threaded end portion of said shaft and said threaded portion comprise threads of a class two fit.

8. A rotor attachment according to claim 6 wherein said shaft body terminates in a radially extending shoulder region adjacent said threaded end portion.

9. A rotor attachment according to claim 8 wherein said shaft locating hole includes a smooth interior surface, said surface terminating at said threaded portion.

10. A rotor attachment according to claim 9 wherein said threaded portion has a diameter less than that of said shaft locating hole.

11. A rotor attachment according to claim 9 wherein a gap exists between said shoulder region of said shaft and said threaded portion of said nut when said nut is tightened against said rotor.

12. A rotor attachment assembly for accurately positioning a rotor on a rotor shaft, comprising:
    a rotor;
    a rotor shaft having a substantially smooth elongated shaft body for attachment to said rotor;
    means for holding said rotor to said shaft;
    said elongated shaft body having a portion for receiving said means for holding; and
    said elongated shaft body being of sufficient length so that a portion of said shaft body extends beyond said rotor when said rotor is in place on said rotor shaft;
    said rotor having a multi-vaned body portion and a nut mating portion, said nut mating portion extending beyond said multi-vaned body portion;
    said nut mating portion having a substantially planar nut mating surface;
    said nut mating surface being perpendicular to said axially-defined aperture of said rotor;
    said means for holding having a substantially planar rotor mating surface for mating with said nut mating surface;
    said smooth shaft body and said means for holding having an interference fit.

13. A rotor attachment according to claim 12 wherein said means for holding comprises a nut.

14. A rotor attachment according to claim 13 wherein said nut has an aperture defined therein, said aperture including a shaft locating hole and a threaded portion for receiving said rotor shaft.

15. A rotor attachment according to claim 14 wherein said shaft locating hole is an unthreaded bore.

16. A rotor attachment according to claim 15, wherein said elongated shaft body is smooth.

17. A rotor attachment according to claim 16, wherein said threaded portion is of less diameter than said shaft body portion.

18. A rotor attachment according to claim 17, wherein said unthreaded bore is slightly longer than said portion of said shaft extending beyond said rotor.

19. A rotor attachment assembly for accurately positioning a rotor on a rotor shaft, comprising:
a rotor;
said rotor having a rotor shaft receiving aperture axially defined therein;
a rotor shaft having a substantially smooth elongated shaft body portion for attachment to said rotor;
said rotor shaft having a threaded end portion;
said threaded end portion having a diameter less than that of said shaft body portion;
a nut for holding said rotor to said shaft, said nut having an aperture axially defined therethrough, said aperture including a shaft locating hole having a smooth inner wall and a threaded bore;
said elongated shaft body portion being of sufficient length so that a portion of said shaft body extends beyond said rotor when said rotor is in place on said rotor shaft;
said rotor having a multi-vaned body portion and a nut mating portion, said nut mating portion extending beyond said multi-vaned body portion;
said nut mating portion of said rotor having a substantially planar nut abutting surface;
said nut abutting surface being perpendicular to said axially-defined aperture of said rotor;
said nut having a substantially planar rotor abutting surface for mating with said nut abutting surface of said rotor when said nut is tightened onto said rotor shaft;
said threaded bore of said nut being coactable with said threaded end portion of said rotor shaft; and
said shaft locating hole being deeper than said portion of said shaft body extending beyond said rotor when said nut is tightened onto said rotor shaft;
said smooth shaft body portion and said smooth inner wall of said nut having an interference fit.

20. A rotor attachment according to claim 19, wherein said threaded end portion of said rotor shaft and said threaded bore comprise threads of a class two fit.

21. A rotor attachment according to claim 19, wherein said shaft locating hole of said nut and said portion of said shaft body have an interference fit.

* * * * *